United States Patent [19]

Carruth et al.

[11] 4,300,929

[45] Nov. 17, 1981

[54] METHOD FOR FORMING GLASS FIBERS

[75] Inventors: Grant F. Carruth, Granville; Michael T. Pellegrin, Newark, both of Ohio; Russell R. Felch; Donald R. Atkinson, both of Aiken, S.C.

[73] Assignee: Owens-Corning Fiberglas Corporation, Toledo, Ohio

[21] Appl. No.: 78,356

[22] Filed: Sep. 24, 1979

[51] Int. Cl.³ .............................................. C03D 37/025
[52] U.S. Cl. .................................................. 65/2; 65/12
[58] Field of Search ................ 65/1, 2, 11 W, 12, 3 R, 65/3 C

[56] References Cited

U.S. PATENT DOCUMENTS

| 4,015,424 | 8/1978 | Levecque et al. | 65/3 C |
| 4,049,415 | 9/1977 | Dent | 65/12 X |
| 4,071,339 | 1/1978 | Griffiths | 65/3 C X |
| 4,088,469 | 5/1978 | Schaefer | 65/12 X |
| 4,141,709 | 2/1979 | Reese | 65/12 X |

Primary Examiner—Robert L. Lindsay, Jr.
Attorney, Agent, or Firm—Ronald C. Hudgens; Philip R. Cloutier; Greg Dziegielewski

[57] ABSTRACT

A method of producing glass fibers is disclosed in which two streams of air are introduced into contact with the newly formed strands, one stream being introduced between the bushing and the size applicator and a second stream being introduced between the applicator and the gathering shoe.

8 Claims, 1 Drawing Figure

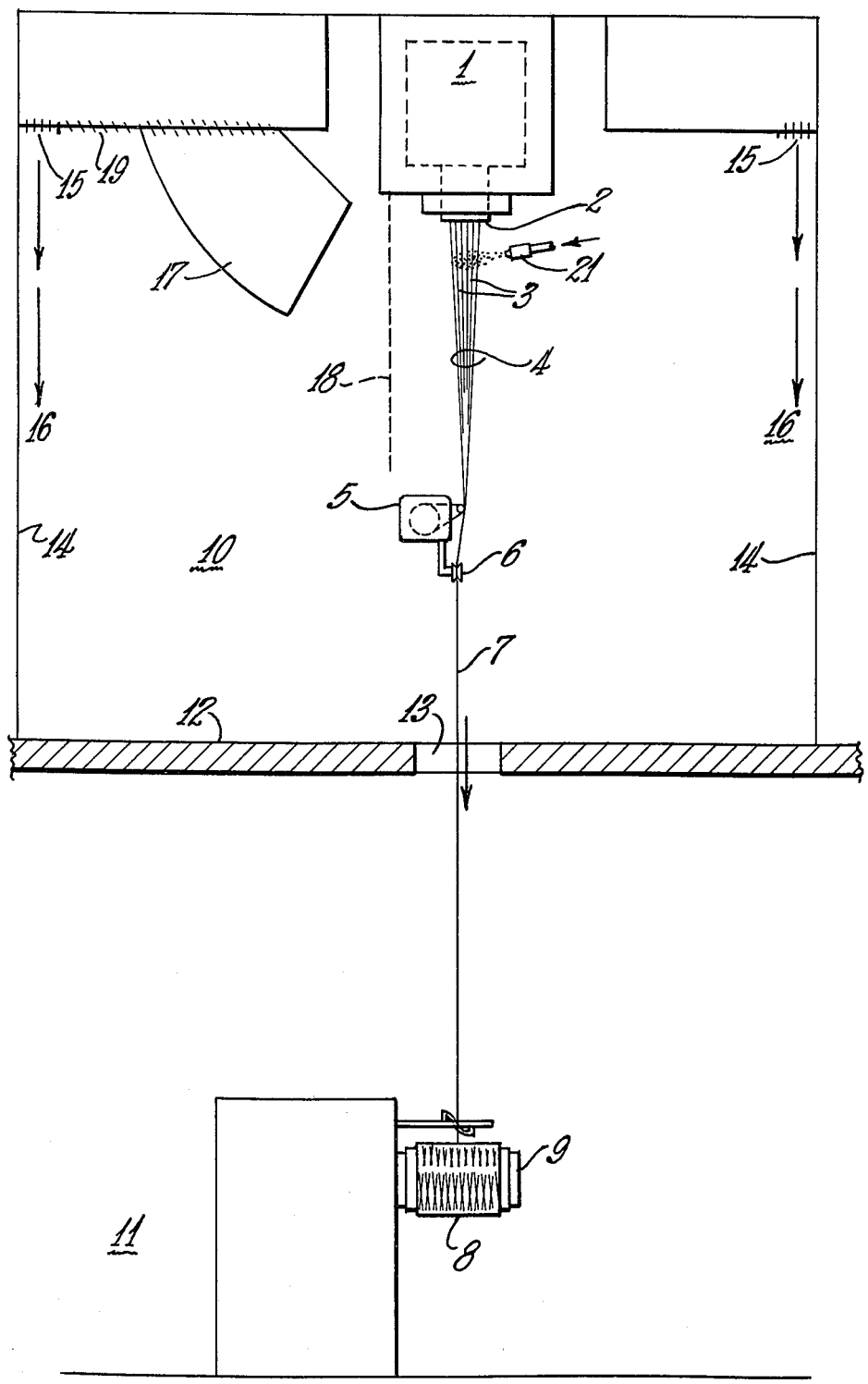

METHOD FOR FORMING GLASS FIBERS

BACKGROUND OF THE INVENTION

This invention relates to method and apparatus for forming glass fibers.

In one of its more specific aspects, this invention relates to a method and apparatus which improve the operation of fiber forming processes.

Glass fibers are conventionally formed by attenuating molten glass as filaments through orifices located in the bottom of a bushing containing molten glass. The filaments which are pulled from the bushing, are passed into contact with pre-pad sprays and, thereafter, with an applicator which coats the filaments with a size. The filaments are then passed into contact with a gathering shoe which combines the filaments into strands. The strands are collected on a collet as a package. The collet is usually located on a floor in the lower level of the fiber forming position.

A major problem in the formation of quality glass filaments lies in controlling the environment at, and directly below, the bushing. Due to the high temperatures within the forming area and the high speeds at which the filaments are drawn, air currents are established upwardly from the bushing and downwardly with the filaments. Therefore, air does not flow directly from the usual ceiling supply to the bushing and then through the floor openings. Generally, a large recirculation region exists in each position. Such air recirculation tends to introduce extraneous matter into contact with the filaments.

It is, therefore, desirable that a controlled atmosphere, including controlled flow of air, be maintained into the upper forming zone. While various air-introduction processes have been proposed, none accomplish the results of the present invention which serves to significantly reduce the number of breaks per hour of the strands at the bushing.

STATEMENT OF THE INVENTION

According to the present invention, in the method of producing glass fibers in which streams of glass are attentuated as filaments in a forming area, the filaments are passed through aqueous pre-pad sprays, then sized by contact with an applicator and gathered at a gathering shoe, there is provided the improvement comprising passing quantities of air into contact with said filaments, one of the quantities contacting the filaments between the bushing and the pre-pad spray impingement and one of the quantities contacting the filaments between the pre-pad spray impingement and the gathering shoe.

In one of its embodiments, air is simultaneously introduced downwardly into the forming area.

DESCRIPTION OF THE DRAWINGS

With reference to the drawing, there is shown a view in elevation of the method of this invention.

With reference to the drawing, there is shown a forehearth 1 which delivers glass to bushing 2.

Filaments 3 are drawn from the bushing as forming fan 4 which is passed in contact with water from pre-pad sprays 21 and, thereafter, with size applicator 5 which applies a size to the filaments. The filaments are then gathered by means of gathering shoe 6 into strand 7 which is accumulated as package 8 on collet 9 of a winder which is not shown.

Each forming position comprising the above equipment is generally divided into an upper level 10 and a lower level 11, having floor 12 therebetween. Opening 13 in the floor is provided for passage of the filaments between the levels. Each forming position can be divided from adjacent forming positions by side shields 14 which tend to isolate adjacent positions as individual processing centers. There can be positioned within each position air introduction means 15 which establishes air curtain 16 circumferentially of each position.

Air introduction means 15 also receives air which is discharged therefrom in two portions. A first portion is discharged through duct 17 and through optional diffuser screen 18 into contact with that segment of the glass filaments extending from the bushing to, and including, the pre-pad sprays.

A second portion of the air is discharged through angularly disposed vents 19 so as to follow the curvature of duct 17 and into contact that segments of the filaments extending from the pre-pad sprays to the gathering shoe.

Generally, the distances between the bushing and the subsequent equipment, such as the pre-pad sprays and the size applicator, will differ from installation to installation.

However, as used herein, the distance between the bottom of the bushing and the pre-pad sprays is considered to be from about 12 inches to about 24 inches, preferably about 18 inches. It is into this section of from about 12 inches to about 24 inches from the bushing bottom that the first portion of air is discharged.

As used herein, the distance between the bushing bottom and size applicator is considered to be from about 28 inches to about 42 inches, preferably about 36 inches. It is into this section of from about 28 inches to about 42 inches from the bushing bottom that the second portion of air is discharged.

The total quantity of air which can be introduced into the forming position can vary over a wide range and, in general, will be dependent upon comfort requirements and upon the glass pull rate from the bushing. In general, any suitable amount of air can be introduced as the air curtain.

As regards the quantity of air which is introduced into contact with the filaments, the quantity introduced as the first portion in contact with the filaments over that length extending from the bushing bottom to the pre-pad sprays will not be less than from about 200 to about 600 cubic feet per minute, preferably about 400 cubic feet per minute or about two thirds of the total of the two quantities.

The quantity of air which is introduced as the second portion into contact with the filaments over that length extending from the pre-pad sprays to the gathering shoe will not be less than about one-half the quantity introduced as the first portion, that is, from about 100 to about 300 cubic feet per minute, preferably about 200 cubic feet per minute or about one third of the total of the two quantities.

In neither introduction, however, should the quantity of air be so great as to disturb the filaments or to create a dust-laden environment through which the filaments must pass.

Preferably, the air will be conditioned air, that is, filtered air at a pressure of about 0.004 to about 0.04 psig, at a temperature within the range of 65° to about 75° and a humidity of about 65 to about 75 percent.

The angularity of the air introduction downward from the horizontal in the direction of the winder will be, to some extent, limited by the physical dimensions of the position and of the equipment therein. Preferably, however, the first portion of the air will be directed downwardly from the horizontal at an angle within the range of from about 15° to about 30°. The second portion of the air will be directed downwardly from the horizontal at an angle within the range of from about 45° to about 90°. It is understood that the portions can each be adjusted to discharge at more than one, or at all angles, within the aforestated ranges.

It has been found that the method of this invention decreases the number of operational disturbances due to break-out of the filaments at the bushing. The following data indicate this.

EXAMPLE I

Air was introduced into a forming position, as described above, and under the conditions set forth below with the following results:

|  | Test I | Test II |
|---|---|---|
| Vertical Distance Covered |  |  |
| By First Air Stream, in. | 18 | 18 |
| By Second Air Stream, in. | 18 | 18 |
| Quantities of Air Streams, CFM |  |  |
| First Air Stream | 400 | 400 |
| Second Air Stream | 200 | 200 |
| Introduction Angle, Below Horizontal; |  |  |
| First Air Stream | 22 | 22 |
| Second Air Stream | 45 | 45 |
| Breaks per Hour |  |  |
| Before Air Introduction | 1.33 | 1.44 |
| During Air Introduction | 1.08 | 1.03 |

Controls were also established which operated simultaneously without benefit of the method of the invention. Breaks per hour for the control runs were as follows:

| Control Number | I | II |
|---|---|---|
| Breaks per Hour |  |  |
| Before Test Run | 1.37 | 1.08 |
| After Test Run | 1.29 | 1.05 |

The above data indicates that the method of this invention results in a substantial improvement in operating performance in terms of reduced break outs per hour.

It will be evident from the foregoing that various modifications can be made to this invention. Such, however, are considered within the scope of the invention.

We claim:

1. In the process of producing continuous glass fibers in which streams of glass are attenuated as filaments from a bushing positioned within a forming zone, the filaments are passed through pre-pad sprays and sized by a size applicator and gathered by a gathering shoe, the improvement comprising introducing from about 200 to about 600 CFM of air into contact with the filaments over the length of the filaments extending from the bottom of said bushing to said pre-pad sprays and introducing from about 100 to about 300 CFM of air into contact with the filaments over the length of the filaments extending from the pre-pad sprays to said gathering shoe, the air quantities being introduced angularly downward from the horizontal.

2. The method of claim 1 in which the pre-pad sprays are positioned a distance of from about 12 to about 24 inches from the bottom of said bushing and the distance from the bottom of said bushing to said applicator size from about 28 inches to about 42 inches.

3. The method of claim 1 in which said first quantity of air is introduced downwardly at an angle within the range of from about 15° to about 30° from the horizontal and said second quantity of air is introduced downwardly at an angle within the range of from about 45° to about 90° from the horizontal.

4. The method of claim 1 in which said first portion constitutes about two thirds of the total air introduced into said process and said second portion constitutes about one third of the total air introduced into said process.

5. The method of claim 2 in which said first quantity of air is introduced downwardly at an angle within the range of from about 15° to about 30° from the horizontal and said second quantity of air is introduced downwardly at an angle within the range of from about 45° to about 90° from the horizontal.

6. The method of claim 1 in which a third quantity of air is introduced into said forming zone.

7. The method of claim 6 in which said third quantity is introduced circumferentially of said forming zone.

8. In the process of producing continuous glass fibers in which streams of glass are attenuated as filaments from a bushing positioned within a forming zone, the filaments are passed through pre-pad sprays and sized by a size applicator and gathered by a gathering shoe, the improvement comprising introducing a first quantity of air into contact with said filaments between said bushing and said pre-pad sprays and a second quantity of air into contact with said filaments between said pre-pad sprays and said size applicator, said first quantity of air and said second quantity of air being separate and distinct quantities of air, the pre-pad sprays being positioned a distance of from about 12 to about 24 inches from the bottom of said bushing, the distance from the bottom of said bushing to said size applicator being from about 28 inches to about 42 inches, said first quantity of air being introduced downwardly at an angle of about 22° below the horizontal and said second quantity of air being introduced downwardly at an angle of about 45° below the horizontal, said first quantity of air being introduced along a length of about 18 inches of the filaments at a rate of about 400 CFM and said second quantity of air being introduced along a length of about 18 inches of the filaments at a rate of about 200 CFM.

* * * * *